United States Patent [19]

Muraki

[11] Patent Number: 4,703,425
[45] Date of Patent: Oct. 27, 1987

[54] LANGUAGE PROCESSING DICTIONARY FOR BIDIRECTIONALLY RETRIEVING MORPHEMIC AND SEMANTIC EXPRESSIONS

[75] Inventor: Kazunori Muraki, Tokyo, Japan

[73] Assignee: NEC Corporation, Tokyo, Japan

[21] Appl. No.: 755,812

[22] Filed: Jul. 17, 1985

[30] Foreign Application Priority Data

Jul. 17, 1984 [JP] Japan .................................. 59-148138

[51] Int. Cl.⁴ ........................ G06F 15/38; G06F 15/21
[52] U.S. Cl. .................................. 364/419; 364/200; 364/900; 434/153
[58] Field of Search ............... 364/419, 200, 900, 300; 434/153

[56] References Cited

U.S. PATENT DOCUMENTS

| | | | |
|---|---|---|---|
| 4,158,236 | 6/1979 | Levy | 364/419 |
| 4,502,128 | 2/1985 | Okajima et al. | 364/419 |
| 4,579,533 | 4/1986 | Anderson et al. | 364/419 |
| 4,599,691 | 7/1986 | Sakaki et al. | 364/419 |

Primary Examiner—Jerry Smith
Assistant Examiner—Kimthanh Tbui
Attorney, Agent, or Firm—Schwartz, Jeffery, Schwaab, Mack, Blumenthal & Evans

[57] ABSTRACT

Morphemic, conceptional or semantic, and syntaxic dictionaries (21–23) keep morphemic, conceptional, and syntaxic items, respectively. Each morphemic item comprises a morphemic description and a first pointer pointing to a set of syntaxic items corresponding to the morphemic description. Similarly, each conceptional item comprises a conceptional description or symbol and a second pointer pointing to a set of syntaxic items. Each syntaxic item comprises a syntaxic description and a third and a fourth pointer pointing to a set of morphemic items and to a set of conceptional items, respectively. Responsive to an input expression, a retrieving arrangement (24) retrieves a morphemic and a conceptional item when the input expression is morphemic and conceptional, respectively. The first or the second pointer of the retrieved item is used in retrieving a syntaxic item by which the morphemic and/or the conceptional dictionary is referred back to. An output expression is produced as a morphemic, a conceptional, and/or a syntaxic expression as desired.

2 Claims, 9 Drawing Figures

| SUPERFICIAL DESCRIPTION | MORPHEME | CONCEPTION |
|---|---|---|
| BIT | BIT | BIT / SMALL |
| BIT | BITE | BITE |
| BITTEN | BITE | BITE |
| FESTIVALS | FESTIVAL | BAZAR |
| FESTIVAL | FESTIVAL | BAZAR |
| FAIRS | FAIR | BAZAR |
| FAIR | FAIR | BAZAR / JUST |
| BAZAR | BAZAR | BAZAR |
| JUST | JUST | JUST |

LANGUAGE PROCESSING DICTIONARY FOR BIDIRECTIONALLY RETRIEVING MORPHEMIC AND SEMANTIC EXPRESSIONS

BACKGROUND OF THE INVENTION

This invention relates to a language processing dictionary for use in a language processing machine, which may be a machine translating system.

A "dictionary" plays various roles in language processing. In a word processor of the type which is widely used in Japan, a dictionary is used in search of Chinese characters and keeps items or entries as indices, each in a kana description and/or a Roman-script spelling for one or a few Chinese characters. In "Kyodo Press," Tokyo, Japan, a Roman script to Chinese and kana script conversion system is in use. An electronic digital computer of a medium scale, NEC 2200/150, is used in combination with a magnetic disk which serves as a dictionary file. The dictionary file keeps word units which have increased in number from 13,000 to about 25,000. The system successfully converts 98°/o of political and financial news sent from abroad in Roman script of the Japanese language.

In a language understanding machine, a dictionary is used which keeps superficial descriptions and descriptions of morphemes, syntaxic information, and conceptional or semantic information. In a language translating system wherein language analysis and generation must be carried out dictionaries are used not only in finding an output conceptional description or symbol from an input morphemic expression but also an output morphemic description from an input conceptional expression. In multilingual machine translation wherein one of at least two languages may be an artifical language as, for example, a machine language, such dictionaries are necessary for each language pair. Inasmuch as it is impossible to use a conventional dictionary bidirectionally between morphemic and conceptional expressions, the machine translating systems have been considerably complicated. Furthermore, a conventional dictionary is undesiredly redundant due to synonyms in the manner which will later be exemplified. This makes it difficult to use the conventional dictionary as a thesaurus.

SUMMARY OF THE INVENTION

It is therefore an object of the present invention to provide a language processing dictionary which can be optionally be used in language analysis and generation.

It is another object of this invention to provide a language processing dictionary of the type described, which is capable of producing an output conceptional description in response to an input morphemic expression, an output morphemic expression in response to either an input morphemic expression or an input conceptional expression, and an output morphemic expression of a target language in response to an input morphemic expression of a source language.

It is still another object of this invention to provide a language processing dictionary of the type described, which is not redundant.

It is yet another object of this invention to provide a language processing dictionary of the type described, which can be used as a thesaurus.

It is a further object of this invention to provide a language processing dictionary of the type described, which is flexibly operable and is useful in a multilingual machine translating system.

Other objects of this invention will become clear as the description proceeds.

According to this invention, there is provided a language processing dictionary which is responsive to an input expression for producing an output expression and which comprises; a morphemic, a conceptional, and a syntaxic dictionary for keeping morphemic, conceptional, and syntaxic items, respectively, wherein each morphemic item comprises a morphemic description and a first pointer pointing to a set of predetermined at least one of the syntaxic items, wherein each conceptional item comprises a conceptional description and a second pointer pointing to a set of prescribed at least one of the syntaxic items, and wherein each syntaxic item comprises a syntaxic description and a third and fourth pointer pointing to a set of preselected at least one of the morphemic items and to a set of preselected at least one of the conceptional items, respectively; and retrieving means responsive to the input expression for retrieving one of the morphemic items as a particular item and one of the conceptional items as a specific item when the input expression is morphemic and conceptional, respectively, responsive to the first pointer of the particular item for retrieving one of the morphemic and the conceptional items as a selected item that is retrieved with reference to the first through the fourth pointers, and responsive to the second pointer of the specific item for retrieving one of the morphemic items as a special item that is retrieved with reference to the first through the fourth pointers, whereby the retrieving means produces one of the morphemic and the conceptional descriptions as the output expression that is comprised by the selected item and produces one of the morphemic descriptions as the output expression that is comprised by the special item.

DESCRIPTION OF THE PREFERRED EMBODIMENTS

Figures 1, 2:
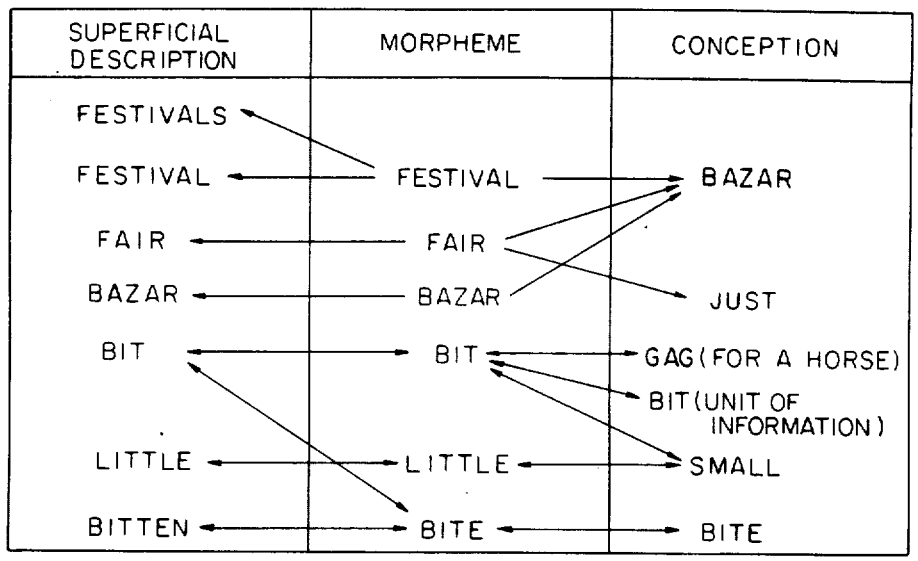
FIG. 1 exemplifies correspondence between superficial descriptions, morphemes, and conceptions for use in describing a language processing dictionary according to the instant invention.
FIG. 2 shows a certain number of items kept in a conventional dictionary.

Referring to FIG. 1, correspondence between superficial or usual descriptions of word units, morphemes, and conceptions or meanings will be described at first in order to facilitate an understanding of the present invention. A word unit, as herein called, is a word actually used in writing, a vocabularly word or phrase, or a like combination of a few vocabulary words. The word "morpheme" is used in a broader sense for the time being. For example, the root infinitive "bite" is listed as a morpheme although it is convenient to understand that the root infinitive consists of two morphemes "bit" and "e" depending on the circumstances. Merely for an easy understanding of the description which follows, each conception will be represented by an English word written in capitals. Such representations will be referred to herein as conceptional or semantic symbols.

It will be obvious from FIG. 1 that two forms are derived as superficial descriptions from a word or stem "festival" listed as a morpheme. Three words "festival," "fair," and "bazar" (bazaar) have a common conception. The word "fair" corresponds to two conceptions. On the other hand, it will be seen that a single superficial description is derived from two stems, one being "bit" corresponding to three conceptions and the other being "bite." In this manner, the superficial descriptions, the morphemes, and the conceptions are complicatedly related to one another.

Turning to FIG. 2, a conventional dictionary may keep items or entries in the manner exemplified. By way of example, the conception "BAZAR" is included in several items. Despite such a redundancy, the dictionary is inoperative as a thesaurus if the dictionary were searched for synonyms only from the superficial description.

Figure 3:
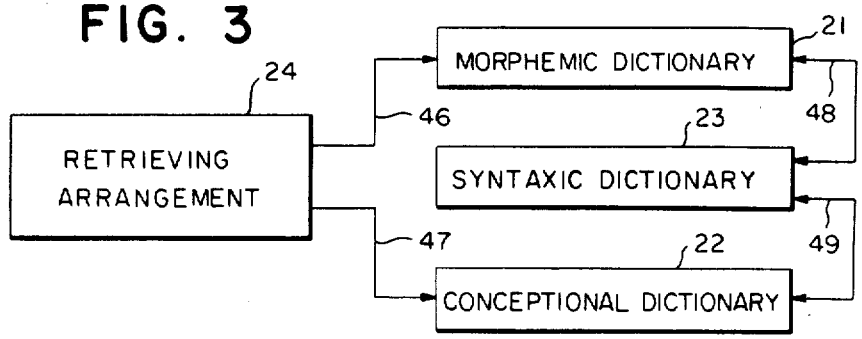
FIG. 3 is a block diagram of a language processing dictionary according to an embodiment of this invention.

Referring now to FIG. 3, a language processing dictionary according to an embodiment of this invention comprises a morphemic dictionary 21, a conceptional or semantic dictionary 22, and a syntaxic dictionary 23. Each of the dictionaries 21 through 23 will be called an elementary dictionary. Each elementary dictionary is a memory which is for keeping dictionary items or entries so that the dictionary items are accessible by memory addresses. The items kept in the morphemic, the conceptional, and the syntaxic dictionaries 21 through 23 are referred to herein as morphemic, conceptional, and syntaxic items, respectively. A block 24 is representative of a retrieving arrangement for use in administrating the elementary dictionaries 21 to 23 in the manner which will later be described.

Figure 4:
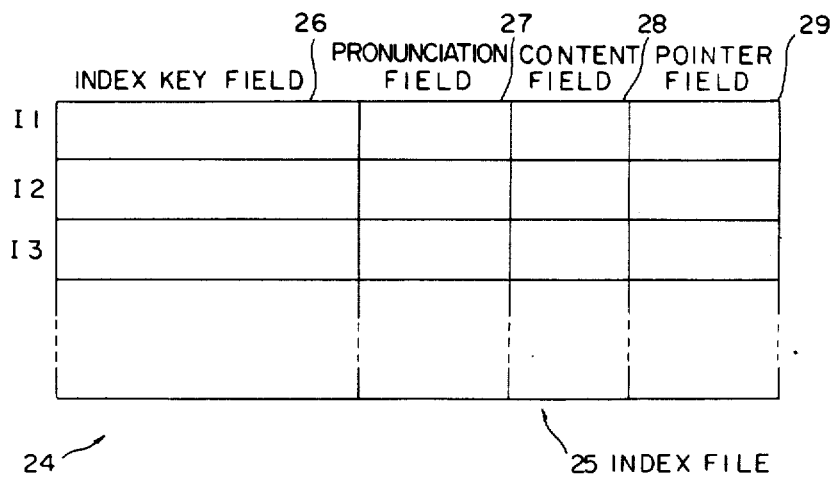
FIG. 4 shows a format for an index file which is for use in a language processing dictionary according to a preferred embodiment of this invention.

Referring to FIG. 4, the retrieving arrangement 24 comprises an index file 25 for keeping first, second, third, and other index items I1, I2, I3, and so forth. Each index item Ii has a predetermined length Li which may be 256 eight-bit bytes long. Preferably, the index file 25 comprises first through fourth fields 26, 27, 28, and 29 which have first through fourth prescribed lengths Li1, Li2, Li3, and Li4, respectively. Typically, the first and the second fields 26 and 27 have lengths of ninty-seven and forty-eight bytes, respectively. The third and the fourth prescribed lengths Li3 and Li4 may be about twenty and forty bytes long, respectively.

The first field 26 is an index key field which may be referred to simply as an index field. The index key field 26 is for keeping indices for the respective index items Ii's. Each index consists of a language specifier and either a morphemic description or a conceptional or sematic symbol.

In connection with the language specifier, attention should be directed to the fact that each conceptional symbol is a conceptional "description" in a language of a sort. In fact, such conceptional descriptions are used in a pivot language known in the art of machine translation. The language specifier is given by a code and is kept for each index item Ii in one of the ninty-seven bytes that stands foremost in the index item field 26. When the language processing dictionary is for use in a machine translating system between only the English and the Japanese languages, the language specifiers may be codes representative of "E" for each English morphemic description, "J" for each Japanese morphemic description, and "C" for each conceptional symbol.

Ninty-six remaining bytes are for the morphomic description or the conceptional symbol. When Chinese characters and kana letters are used for the morphemic descriptions in the Japanese language, two bytes should be assigned to each of the Chinese characters and the kana letters. Only one byte is sufficient for each Roman or kana letter.

The morphemic description gives a morpheme used in each superficial description. It is preferred that the morpheme "festival" and the declensional ending or suffix "s" be kept in two separate index items. Similarly, the morpheme "bit" and the conjugational and participle endings "e," "es," and "ten" be kept in four different index items.

The second field 27 is a pronunciation field. In each index item 11, the pronunciation field 27 keeps a pronunciation of the morphemic description kept in the index key field 26. The International Phonetic Alphabet may be used in representing the pronunciation. If desired, more detailed pronunciation may be given in an "analphabet" system described by Kenneth Lee Pike in "Phonemics: A Technique for Reducing Languages for Writing" published 1947 by University of Michigan Press.

The third field 28 is a content field. Depending on each morphemic or conceptional description, the content field 28 keeps a field of use of the morphemic or the conceptional description. The field of use may indicate "a declensional ending" and "a conjugational ending" for morphemic descriptions "s" in two separate index items.

The fourth field 29 is a pointer field for keeping morphemic and conceptional item pointers which correspond to the morphemic description and the conceptional symbol kept in the respective index items Ii's, respectively. The item pointers are used when the morphemic descriptions and the conceptional symbols are accessed in the manner which will become clear as the description proceeds. It may be mentioned here that each morphemic item pointer points to a set of predetermined at least one of the morphemic items kept in the morphemic dictionary 21. Each conceptional item pointer points to a set of prescribed at least one of the conceptional items kept in the conceptional dictionary 22.

Figure 5:
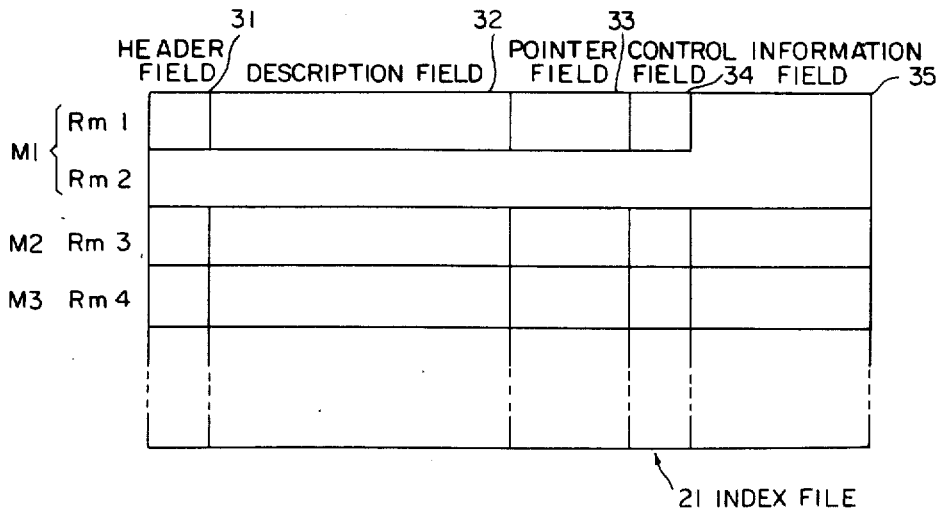
FIG. 5 shows a format for a morphemic dictionary which is for use in the language processing dictionary of the type mentioned in conjunction with FIG. 4.

Turning to FIG. 5, the morphemic dictionary 21 is for keeping first, second, third, and other physical records Rm1, Rm2, Rm3, . . . at the above-mentioned memory addresses, respectively. Each physical record Rmi has a predetermined length Lm which may be again 256 bytes long. The afore-mentioned morphemic items are depicted as first, second, third, and like morphemic items or logical records M1, M2, M3, and so on. In the example being illustrated, the first morphemic item M1 consists of the first and the second physical records Rm1 and Rm2. Each of the second and the third morphemic items M2 and M3 consists of a single physical record. Each morphemic item Mi is accessible by the memory address assigned to the physical record which stands first in the morphemic item Mi.

Each morphemic item Mi is preferably kept in first through fifth fields 31, 32, 33, 34, and 35. The first through the fourth fields 31 to 34 have first through fourth prescribed lengths Lm1, Lm2, Lm3, and Lm4, respectively. Typically, the first prescribed length Lm1 is ten bytes long. The second prescribed length Lm2 is equal to the first prescribed length Li1 of the index key field 26. The third and the fourth prescribed lengths Lm3 and Lm4 are forty and ten bytes long, respectively. Under the circumstances, the fifth field 35 has lengths of ninty-nine bytes and ninty-nine plus an integral multiple of 256 bytes when the morphemic item Mi consists of only one physical record and a plurality of physical records, respectively.

The first field 31 is called a header field and is for typically keeping information related to the physical record or records of the morphemic item Mi under consideration. For instance, the information gives the merory addresses of each physical record which should be additionally referenced on using a morphemic item kept in a plurality of physical records. The second field 32 is a description field for keeping a morphemic description like the index key field 26 of the index file 25. For example, the morphemes "festival" and "s" are separately kept in different morphemic items. The morphemes "bit" and "e" are similarly kept in separate morphemic items. When a certain index item of the index file 25 keeps "festival" as the morphemic description, the morphemic item pointer of that index item points to that morphemic item as a morphemic item set in which the morphemic description "festival" is included.

The third field 33 is a first pointer field for keeping a first pointer pointing to a set of predetermined at least one of the syntaxic items in the manner which will later become clear. The fourth field 34 is a control field for keeping information which is useful in controlling retrieval of a desired one of the syntaxic items. The fifth field 35 is an information field for keeping various morphemic information which is related to the morphemic description kept in the morphemic field 32 of the same morphemic item. For example, the information field 35 of a morphemic item gives the information such that the morphemic description "s" is a declensional ending. The information field 35 of another morphemic item gives the information such that the morphemic description "s" is a conjugational ending.

Figure 6:
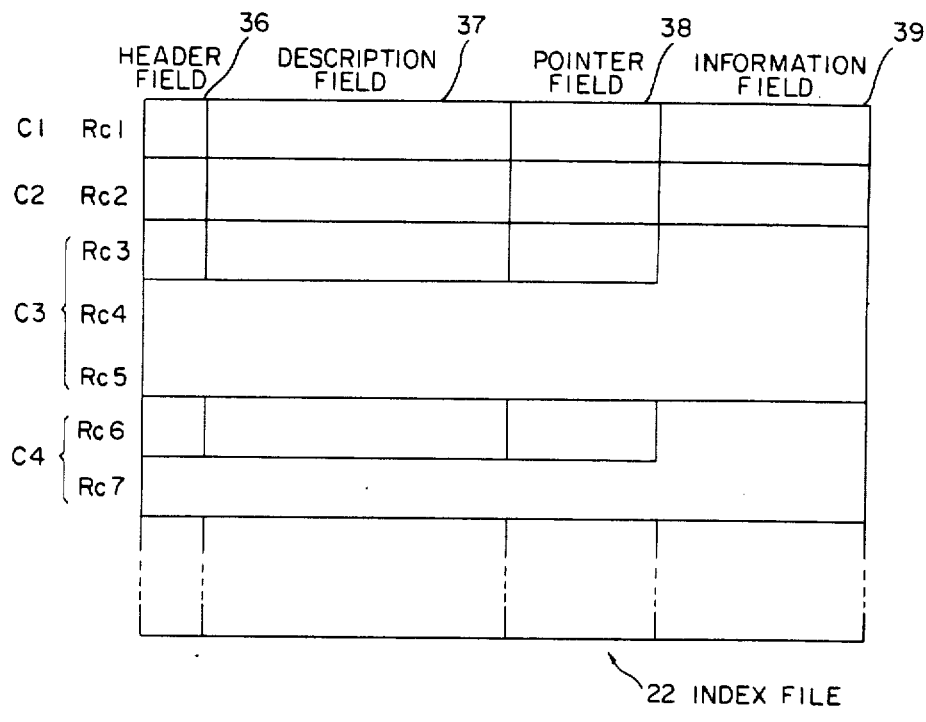
FIG. 6 shows a format for a conceptional dictionary which is for use in combination with the morphemic dictionary of the format depicted in FIG. 4.

Further turning to FIG. 6, the conceptional dictionary 22 is for keeping first, second, third, and similar physical records Rc1, Rc2, Rc3, . . . at the respective memory addresses. Each physical record Rci has a predetermined length Lc which may again be 256 bytes long. The above-mentioned conceptional items are illustrated as first, second, third, and other conceptional items or logical records C1, C2, C3, and so on. In the illustrated example, each of the first and the second conceptional items C1 and C2 consists of a single physical record. The third conceptional item C3 consists of the third through the fifth physical records Rc3 to Rc5. The fourth conceptional item C4 consists of the sixth and the seventh physical records Rc6 and Rc7. Each conceptional item Ci is accessible by the memory address assigned to the physical record which appears foremost in the conceptional item Ci.

Each conceptional item Ci is preferably kept in first through fourth fields 36, 37, 38, and 39. The first through the third fields 36 to 38 have first through third lengths Lc1, Lc2, and Lc3, respectively, among which the first and the second lengths Lc1 and Lc2 are prescribed and are equal to the first prescribed lengths Lm1 and Li1 of the header field 31 and the index item field 26, respectively. The third length Lc3 is variable. Typically, the third length Lc3 may be fifty bytes long. In this event, the fourth field 39 has lengths of ninty-nine bytes and ninty-nine plus an integral multiple of 256 bytes like the information field 35 of each morphemic item Mi when the conceptional item Ci consists of only one physical record and a plurality of physical records, respectively.

The first field 36 is called a header field like the first field 31 of each morphemic item Mi and is used like the header field 31 described above. The second field 37 is a description field for keeping a conceptional symbol. The third field 38 is a second pointer field for keeping a second pointer pointing to a set of prescribed at least one of the syntaxic items in the manner which will be described later in conjunction with the first pointer. The fourth field 39 is an information field for keeping various conceptional information which is related to the conceptional symbol kept in the description field 37 of the conceptional item in question.

Figure 7:
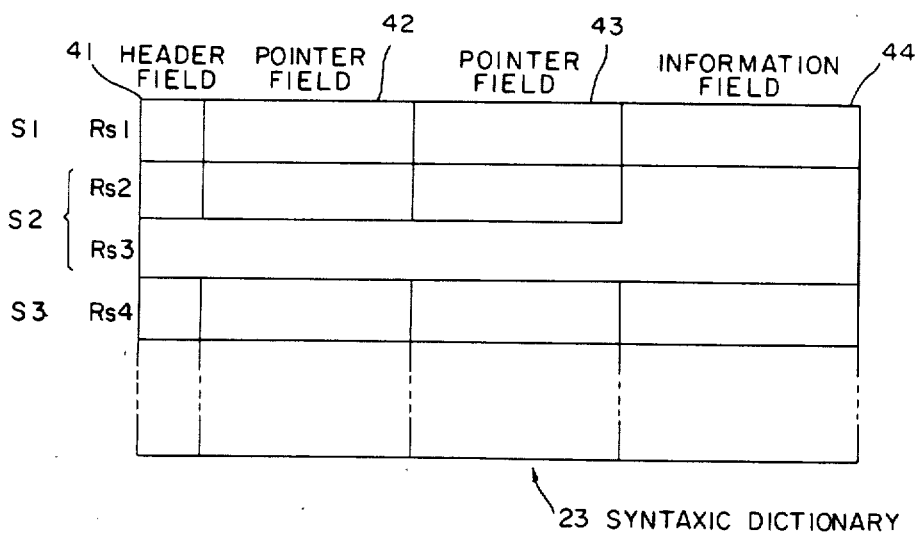
FIG. 7 shows a format for a syntaxic dictionary which is for use together with the morphemic and the conceptional dictionaries mentioned in connection with FIGS. 4 and 5.

Still further turning to FIG. 7, the syntaxic dictionary 23 is for keeping first, second, third, and other physical records Rs1, Rs2, Rs3, . . . at the respective memory addresses. Each physical record Rsi has a predetermined length Ls which may once again be 256 bytes long. The above-mentioned syntaxic items are shown as first, second, third, and like syntaxic items or logical records S1, S2, S3, and so forth. In the example being illustrated, the first syntaxic item S1 consists of the first physical record Rs1 alone. The second syntaxic item S2 consists of the second and the third physical records Rs2 and Rs3. Each syntaxic item Si is accessible by the memory address allotted to the physical record which appears first in the syntaxic item Si.

Each syntaxic item Si is preferably kept in first through fourth fields 41, 42, 43, and 44. The first through the third fields 41 to 43 have first through third lengths Ls1, Ls2, and Ls3, respectively, among which the first and the second lengths Ls1 and Ls2 are prescribed and are equal to the first prescribed lengths Lml and Li1 of the header field 31 or 36 and the index key field 26, respectively. The third length Ls3 is variable. When the third length Ls3 is fifty bytes long, the fourth field 44 has lengths of ninty-nine bytes and ninty-nine plus an integral multiple of 256 bytes like the information field 35 of each morphemic item Mi or the information field 39 of each conceptional item Ci if the syntaxic item Si consists of only one physical record and a plurality of physical records, respectively.

The first field 41 is a header field which is used like the header field 31 of each morphemic item Mi and the header field 36 of each conceptional item Ci. The second field 42 is a third pointer field for keeping a third pointer pointing to a set of preselected at least one of the morphemic items Mi's. The third field 43 is a fourth pointer field for keeping a fourth pointer pointing to a set of preselected at least one of the conceptional items Ci's. The third and the fourth pointers are operable in the manner which will later become clear.

The fourth field 44 is an information field for keeping various syntaxic information as syntaxic descriptions. In the information field 44 of the syntaxic items Si's, the syntaxic information or descriptions represent the parts of speech. The syntaxic information for the nouns may represent the genders, the numbers, the cases, and the like. For verbs, the syntaxic information may represent the tenses, the persons, the numbers, and the like. Furthermore, the syntaxic information should indicate, for some of the morphemes and combinations of morphemes, various information related to the use or the connections thereof to other morphemes and combinations of morphemes. For example, various uses of the morpheme "think" are included in the syntaxic information or description therefor.

Referring again to FIG. 3, the language processing dictionary produces an output expression when supplied with an input expression from, for example, a keyboard machine. The output expression may be produced through either a printer or a speech synthesizer.

It is preferred that the input expression is accompanied by an input language specifier and a dictionary specifier which will herein be designated by A and B, respectively. Codes "E," "J," and "C" are exemplified before as the language specifier used in the index key field 26 (FIG. 4) of the index file 25. Each of such language specifiers is used as the input language specifier A. The dictionary specifier B is for specifying one or more of the elementary dictionaries 21 through 23 that should produce the output expression or expressions. By way of example, a code "C" is used when it is desired to get an output expression from the conceptional dictionary 22 in the conceptional symbol or symbols. Another code "S" is used in making the syntaxic dictionary 23 produce the syntaxic information as an output expression. Codes "E" and "J" may be used in producing an English and a Japanese output expression, respectively, from the morphemic dictionary 21. Merely for brevity of description, a single code "M" will be used instead of separately specifying the languages in which the morphemic dictionary 21 should produce the output expression. The dictionary specifier B may specify all three elementary dictionaries 21 through 23. Each morphemic or conceptional description in the index file 25 will be called an index word and will be represented by W.

The retrieving arrangement 24 is operable like an electronic digital computer. Responsive to the input expression, the retrieving arrangement 24 accesses the index file 25 in search of each concatenation of the input language specifier A and the index word W. It is preferred that the index file 25 be accessed in accordance with the B-tree search known in the art of computers. If desired, reference should be had to at least one of various publications as regards the B-tree search. One of such publications is an article contributed by Douglas Comer to "Computing Serveys," Vol. 11, No. 2 (June 1979), pages 121-137, under the title of "The Ubiquitous B-Tree."

When the input expression is morphemic, the retrieving arrangement 24 retrieves that one of the index items Ii's as a particular item for which the index key field 26 keeps the concatenation given in response to the input expression. The morphemic item pointer included in the particular item and kept in the pointer field 29, is delivered to the morphemic dictionary 21 as a particular pointer illustrated by a first unidirectional pointer 46. When the input expression is conceptional, the retrieving arrangement 24 retrieves that one of the index items Ii's as a specific item for which the index field 26 keeps the concatenation given by the input expression. The conceptional item pointer kept in the pointer field 29 for the specific item, is fed to the conceptional dictionary 22 as a specific pointer depicted as a second unidirectional pointer 47.

Responsive to the first unidirectional pointer 46, the retrieving arrangement 24 retrives each of those of the morphemic items Mi's as a first selected item which are elements of the morphemic item set indicated by the first unidirectional pointer 46. The retrieving arrangement 24 makes the morphemic dictionary 21 deliver a morphemic to syntaxic pointer to the syntaxic dictionary 23. The morphemic to syntaxic pointer will be referred to hereafter as a first bidirectional pointer 48 for the reason which will presently become clear. At this instant, the first bidirectional pointer 48 consists of at least one first pointer which is kept in the first pointer field 33 (FIG. 5) of the first selected item. The first bidirectional pointer 48 therefore points to those of the syntaxic items Si's which are elements of the syntaxic item set indicated by the first bidirectional pointer 48.

Responsive to the first bidirectional pointer 48, the retrieving arrangement 24 retrieves each of the syntaxic items of the syntaxic item set as a second selected item. The retrieving arrangement 24 makes the syntaxic dictionary 23 feed a syntaxic to morphemic pointer back to the morphemic dictionary 21 and deliver a syntaxic to conceptional pointer to the conceptional dictionary 22. The syntaxic to morphemic pointer is illustrated as the first bidirectional pointer 48. The syntaxic to conceptional pointer will be called a second bidirectional pointer 49. The syntaxic to morphemic pointer consists of at least one third pointer which is kept in the third pointer field 42 (FIG. 7) of the second selected item. The second bidirectional pointer 49 consists of at least one fourth pointer which is kept in the fourth pointer field 43 for the second selected item.

Responsive to the syntaxic to morphemic pointer and preferably in consideration of the syntaxic information kept in the information field 44 of the second selected item, the retrieving arrangement 24 retrieves an optimum morphemic item. Similarly, the retrieving arrangement 24 retrieves each of those of the conceptional items Ci's as a third selected item which are elements of the conceptional item set indicated by the second bidirectional pointer 49. The conceptional dictionary 22 feeds a conceptional to syntaxic pointer as the second bidirectional pointer 49 back to the syntaxic dictionary 23. The conceptional to syntaxic pointer consists of at least one second pointer which is kept in the second pointer field 38 (FIG. 6) for the third selected item.

It is now understood that the retrieving arrangement 24 retrieves one of the morphemic and the conceptional items Mi's and Ci's as a selected item in response to the first unidirectonal pointer 46 that is retrieved with reference to the first through the fourth pointers. The retrieving arrangement 24 thereby produces one of the morphemic and the conceptional descriptions as at least a part of the output expression that is included in the selected item. The retrieving arrangement 24 likewise retrieves one of the morphemic items Mi's as a special item in response to the second unidirectional pointer 47 that is retrieved with reference to the first through the fourth pointers. The retrieving arrangement 24 produces one of the morphemic descriptions as at least a part of the output expression that is included in the special item. If desired, the language processing dictionary produces the output expression in the syntaxic information, namely, in the syntaxic description or descriptions. The morphemic and the conceptional descriptions kept in the index file 25 may be called morphemic and conceptional expressions depending on the circumstances.

It is possible to understand that the retrieving arrangement 24 comprises a first and a second part. The first part is for producing the first or the second unidirectional pointer 46 or 47 according to the B-tree search and for retrieving the particular or the specific item. The second part is for producing the first and the second bidirectional pointers 48 and 49 and for retrieving the selected item or the special item to thereby produce the output expression. It is possible to produce the first and the second unidirectional pointers 46 and 47 without resorting to the B-tree search.

When a morpheme "festival" is given as an index word W, the first unidirectional pointer 46 points to a morphemic item which includes "festival" as the morphemic description in the description field 32. The first bidirectional pointer 48 points to a syntaxic item including "noun" as the syntaxic information in the information field 44. When a morphemic item including a morpheme "bit" is indicated by the first unidirectional pointer 46, the first bidirectional pointer 48 points to a syntaxic item set which includes "noun," "adjective," "verb," and "past participle" as the syntaxic information. Depending on another morphemic item next indicated by the first unidirectional pointer 46, one of the syntaxic items of the syntaxic item set is selected. The second bidirectional pointer 49 points to a conceptional item which includes one of four conceptional symbols depicted in FIG. 2 for the morphemes "bit" and "bite" and kept in the description field 37. It has been confirmed that the language processing dictionary is successfully operable.

Figure 8A:
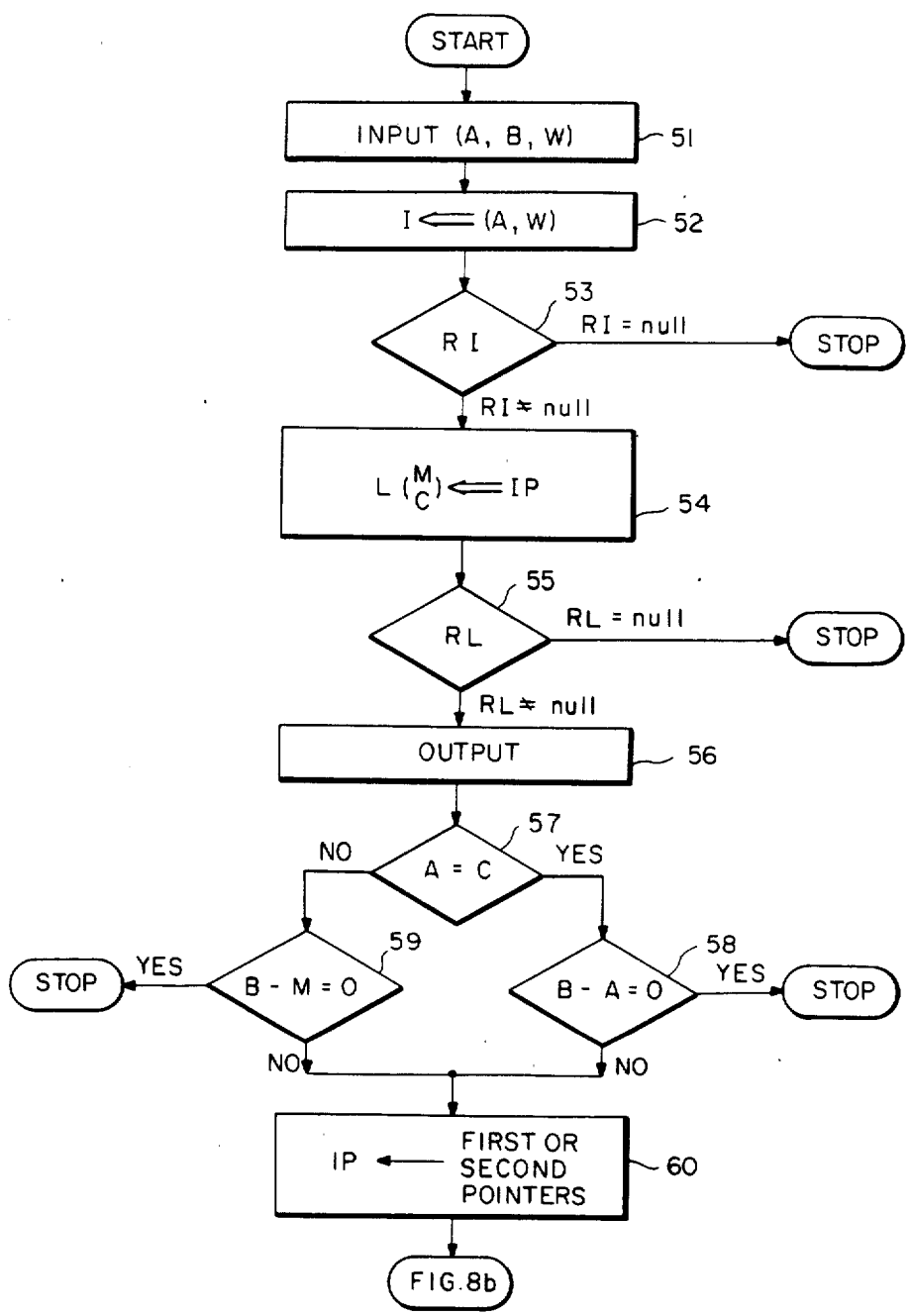
FIGS. 8a and 8b collectively show a flow chart for use in describing operation of a retrieving arrangement which is for use in the language processing dictionary of the type illustrated in FIG. 3.
Figure 8B:
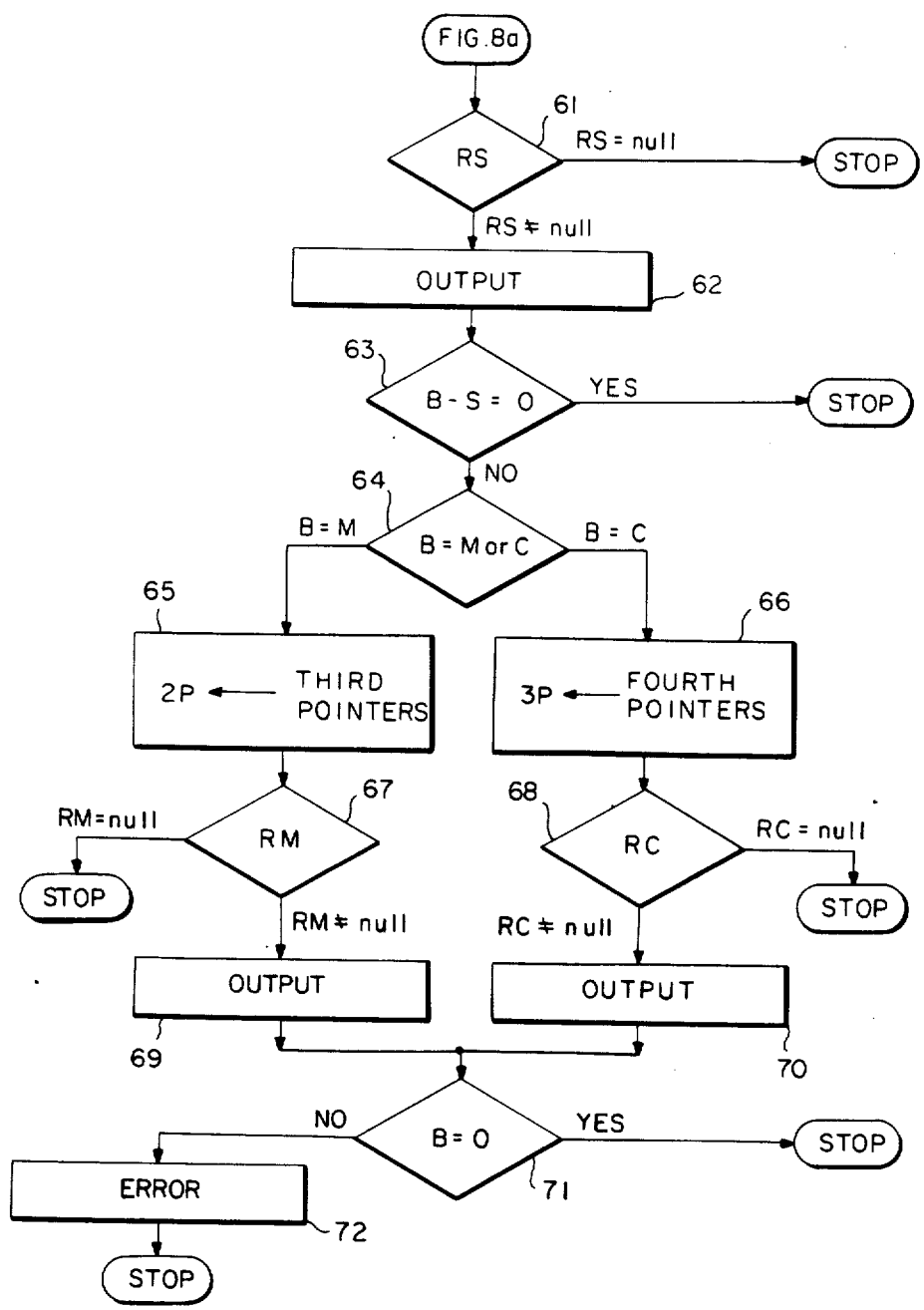

Referring now to FIGS. 8a and 8b, operation of the retrieving arrangement 24 will be described in order to facilitate implementation thereof. In the manner described before, an input expression is given by the input language specifier A, the dictionary specifier B, and index words W's as depicted at a first stage 51. At a second stage 52, the index file 25 is accessed by each concatenation of the input language specifier A and the index word W to get an index item I. In the manner illustrated at a third stage 53, a result RI of retrieval of the index item I may not be null or be null, namely, be successful or unsuccessful. If the result RI is null, the retrieval fails and comes to an end. Depending on the circumstances, a new index item must be added to the index file 25.

When the result RI is not null, either a morphemic or a conceptional item pointer IP is produced as the first or the second unidirectional pointer 46 or 47. In a fourth stage 54, M and C represent the morphemic and the conceptional dictionaries 21 and 22. L represents a pertinent one of the morphemic and the conceptional dictionaries 21 and 22. The retrieving arrangement 24 retrieves a pertinent item L from the pertinent dictionary 21 or 22 in response to the morphemic or the conceptional item pointer IP. In the manner depicted in a fifth stage 55, a result RL of retrieval of the pertinent item L may not be or be null. If the result RL is null, the retrieval comes to an end.

When the result RL is not null, the result RL may be produced as an output expression at a sixth stage 56. At a seventh stage 57, the input language specifier A is checked. If the input language specifier A specifies the conceptional dictionary 22 (C), coincidence between the input language specifier A and the dictionary specifier B is checked at an eighth stage 58. If not, the dictionary specifier B is checked at a ninth stage 59 whether or not the morphemic dictionary 21 (M) is specified. When the input language specifier A is coincident with the dictionary specifier B at the eighth stage 58, the retrieval comes to an end. When the dictionary specifier B specifies the morphemic dictionary 21 at the ninth stage 59, the retrieval comes also to an end.

Either when the coincidence is not found at the eighth stage 58 or when the dictionary specifier B does not specify the morphemic dictionary 21 at the ninth stage 59, the first or the second pointers of the pertinent item L are collected at a tenth stage 60 into a first pointer collection IP for use in retrieving a syntaxic item S in the syntaxic dictionary 23. A result RS of retrieval of the syntaxic item S may not be null or be null in the manner indicated at an eleventh stage 61. If the result RS is null, the retrieval comes to an end. It should be noted here that the syntaxic item S, as herein called, is a set of the afore-mentioned predetermined or prescribed at least one of the syntaxic items Si's.

When the result RS is not null, an output expression may be produced at a twelfth stage 62 in the syntaxic description or descriptions. At a thirteenth stage 63, the dictionary specifier B is again checked whether or not the syntaxic dictionary 23 (S) is specified. If the syntaxic dictionary 23 is specified, the retrieval is successful and comes to an end.

When the syntaxic dictionary 23 is not specified at the thirteenth stage 63, the dictionary specifier B is further checked at a fourteenth stage 64 whether the morphemic dictionary 21 (M) or the conceptional dictionary 22 (C) is specified. When the morphemic dictionary 21 is specified, the third pointers are collected at a fifteenth stage 65 into a second pointer collection 2P for retrieval of a morphemic item M in the morphemic dictionary 21. When the conceptional dictionary 22 is specified, the fourth pointers are collected at a sixteenth stage 66 into a third pointer collection 3P for retrieval of a conceptional item C in the conceptional dictionary 22. A result RM of retrieval of the morphemic item M may not be null or be null in the manner depicted at a seventeenth stage 67. If the result RM is null, the retrieval comes to an end. A result RC of retrieval of the conceptional item C may not or be null in the manner shown at an eighteenth stage 68. If the result RC is null, the retrieval also comes to an end.

When the result RM is not null at the seventeenth stage 67, the result RM is produced at a ninteenth stage 69 as an output expression. The result RC is likewise produced at a twentieth stage 70 as an output expression. It is convenient that the codes M, C, and/or S for the elementary dictionaries 21 through 23 be deleted from the input expression at the thirteenth and the fourteenth stages 63 and 64. In this event, the dictionary specifier B should indicate at a twenty-first stage 71 no elementary dictionary. In any event, the retrieval is complete and comes to an end when it is found at the twenty-first stage 71 that the retrieval is carried out for the elementary dictionary or dictionaries which the dictionary specifier B specifies in the input expression. If at least one elementary dictionary is found at the twenty-first stage 71 that should further be accessed, an error must have occurred during the retrieval. The fact is indicated at a twenty-second stage 72. At any rate, the retrieval comes to an end.

While this invention has thus far been described in conjunction with a general and a more preferred embodiment thereof, it will now be readily possible for one skilled in the art to put this invention into practice in various other manners. For example, it is possible to provide the elementary dictionaries 21 through 23 by a single memory. On the other hand, the index file 25 may be divided into a plurality of memories for the morphemic and the conceptional descriptions and for the morphemic descriptions in the respective languages. Above all, the elementary dictionaries 21 to 23 can be accessed by the memory addresses of the respective items rather than by those of the physical records.

What is claimed is:

1. A language processing dictionary responsive to an input expression for producing an output expression, said language processing dictionary comprising;

a morphemic, a conceptional, and a syntaxic dictionary for keeping morphemic, conceptional, and syntaxic items, respectively, each morphemic item comprising a morphemic description and a first pointer pointing to a set of predetermined at least one of said syntaxic items; each conceptional item comprising a conceptional description and a second pointer pointing to a set of prescribed at least one of said syntaxic items; each syntaxic item comprising a syntaxic description and a third and a fourth pointer pointing to a set of preselected at least one of said morphemic items and to a set of preselected at least one of said conceptional items, respectively; and retrieving means responsive to said input expression for retrieving one of said morphemic items as a particular item and one of said conceptional items as a specific item when said input expression is morphemic and conceptional, respectively, responsive to the first pointer of said particular item for retrieving one of said morphemic and said conceptional items as a selected item that is retrieved with reference to the first through the fourth pointers, and responsive to the second pointer of said specific item for retrieving one of said morphemic items as a special item that is retrieved with reference to the first through the fourth pointers, said retrieving means thereby producing one of the morphemic and the conceptional descriptions as said output expression that is comprised by said selected item and producing one of the morphemic descriptions as said output expression that is comprised by said special item.

2. A language processing dictionary as claimed in claim 1, wherein said retrieving means comprises:

an index file comprising an index field and a pointer field, said index field being for keeping morphemic and conceptional expressions, said pointer field being for keeping morphemic item pointers and conceptional item pointers corresponding to said morphemic and said conceptional expressions, respectively, each morphemic item pointer pointing to a set of predetermined at least one of said morphemic items, each conceptional item pointer pointing to a set of prescribed at least one of said conceptional items;

first retrieving means responsive to said input expression for retrieving, with reference to said morphemic and said conceptional expressions, one of said morphemic item pointers as a particular pointer and one of said conceptional item pointers as a specific pointer when said input expression is morphemic and conceptional, respectively, responsive to said particular pointer for retrieving said particular item from the morphemic item set which said particular pointer points to, and responsive to said specific pointer for retrieving said specific item from the conceptional item set which said specific pointer points to; and second retrieving means responsive to the first pointer of said particular item for retrieving said selected item and responsive to the second pointer of said specific item for retrieving said special item, said second retrieving means thereby producing one of the morphemic and the conceptional descriptions as said output expression that is comprised by said selected item and producing one of the morphemic descriptions as said output expression that is comprised by said special item.

* * * * *